United States Patent
Dziurda (10) Patent No.: US 9,710,713 B2
(45) Date of Patent: Jul. 18, 2017

(54) METHODS AND APPARATUS TO PERFORM IMAGE MASKING BASED ON RELATIVE MOTION OF OBJECTS

(71) Applicant: GM GLOBAL TECHNOLOGY OPERATIONS LLC, Detroit, MI (US)

(72) Inventor: Robert A. Dziurda, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 14/729,356

(22) Filed: Jun. 3, 2015

(65) Prior Publication Data
US 2016/0358022 A1  Dec. 8, 2016

(51) Int. Cl.
G06K 9/00 (2006.01)
G06T 7/00 (2017.01)
G06T 7/70 (2017.01)
G06T 7/194 (2017.01)

(52) U.S. Cl.
CPC ......... *G06K 9/00791* (2013.01); *G06T 7/194* (2017.01); *G06T 7/70* (2017.01); *G06T 7/97* (2017.01); *G06T 2207/10004* (2013.01); *G06T 2207/20024* (2013.01); *G06T 2207/30252* (2013.01); *G06T 2207/30268* (2013.01)

(58) Field of Classification Search
USPC .......................................... 382/103
See application file for complete search history.

(56) References Cited

U.S. PATENT DOCUMENTS

| | | | |
|---|---|---|---|
| 2012/0148103 A1* | 6/2012 | Hampel | G06K 9/00771 382/103 |
| 2015/0175088 A1* | 6/2015 | Chang | B60R 11/04 348/148 |
| 2015/0224845 A1* | 8/2015 | Anderson | B60G 17/019 701/37 |

FOREIGN PATENT DOCUMENTS

EP  1918876 A1 *  5/2008  ........... G06T 7/0002

* cited by examiner

*Primary Examiner* — Gregory F Cunningham
(74) *Attorney, Agent, or Firm* — Lorenz & Kopf, LLP (57) ABSTRACT

A method for processing a plurality of images associated with a motor vehicle is provided. The method identifies an object in the plurality of images; determines whether the object is located in the background of the plurality of images; and when the object is located in the background of the plurality of images, filters the object from a presentation of the plurality of images.

18 Claims, 6 Drawing Sheets

METHODS AND APPARATUS TO PERFORM IMAGE MASKING BASED ON RELATIVE MOTION OF OBJECTS

TECHNICAL FIELD

Embodiments of the subject matter described herein relate generally to image masking. More particularly, embodiments of the subject matter relate to masking objects in a captured image based on distance from a reference point.

BACKGROUND

An outside view from the interior of a motor vehicle is at least partially obscured by various structures and components of the vehicle itself. For example, an A-pillar, a car door, a dashboard, or another part (or combination of parts) of the interior of a vehicle may block a portion of the view out of the windshield and/or other car windows. Such obscuration may be reduced by the projection of a live image on the interior parts that are blocking the outside view. However, a projected image can only be easily aligned to either foreground or background objects at one time. For example, foreground objects can be aligned to the projected image, but background objects may be misaligned or improperly scaled/distorted. This misalignment or distortion causes distraction to the viewer. Additionally, it would be beneficial to mask or remove the background of the image as the displayed resolution is too low and becomes distracting to the viewer. The background portion of the image is unnecessary to assist in reducing "blind spots" (e.g., an obscured outside view).

Accordingly, it is desirable to calculate the distance of objects located around a vehicle. As the vehicle is moving through a stationary environment the surrounding objects have a unique "relative" motion (e.g., relative to each other and the vehicle). The difference in relative motion corresponds directly to the vehicle speed and the distance from the camera lens to the object being viewed. Calculating the distance of objects in this manner is valuable for active safety systems like pedestrian detection, collision mitigation, or detection of hazards around the vehicle. One exemplary application may include the ability to add depth to a night vision image by highlighting objects such as an animal that is located near the vehicle, and masking the background portion of the image to better highlight the location and distance to the animal.

Furthermore, other desirable features and characteristics will become apparent from the subsequent detailed description and the appended claims, taken in conjunction with the accompanying drawings and the foregoing technical field and background.

BRIEF SUMMARY

A method for processing a plurality of images associated with a motor vehicle is provided. The method identifies an object in the plurality of images; determines whether the object is located in the background of the plurality of images; and when the object is located in the background of the plurality of images, filters the object from a presentation of the plurality of images.

A system for presenting a captured image associated with a motor vehicle is provided. The system includes: a camera module, configured to capture a plurality of images outside a motor vehicle; an image data analysis module, configured to identify an object in the plurality of images, and to determine whether the object is located within a radius of a reference point of the motor vehicle; an image editing module, configured to create an output image by masking the object from the plurality of images when the object is not located within the radius of the reference point; and a presentation module, configured to display the output image created by the image editing module.

A non-transitory, computer-readable medium containing instructions thereon, is provided. When executed by a processor, the instructions perform a method. The method identifies a plurality of objects depicted in a sequence of images captured outside of a motor vehicle, each of the plurality of objects being located outside of the motor vehicle; calculates a translation rate for each of the plurality of objects, based on an analysis of the captured sequence of images; masks a subset of the plurality of objects from the sequence of images, based on the calculated translation rate for each of the plurality of objects, to create an output image; and presents the output image.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods used to identify objects depicted in a plurality of images (e.g., a video feed or group of still-frame images) that are outside of a specified radius of a reference point, and masking the objects from a displayed version of the images. Here, the captured images are acquired outside of a vehicle and displayed on the interior of the vehicle for purposes of eliminating "blind spots". Objects determined to be within the specified radius are projected such that they are clearly visible to the driver of the vehicle. However, objects located outside the radius are eliminated from the interior vehicle display.

Figure 1:
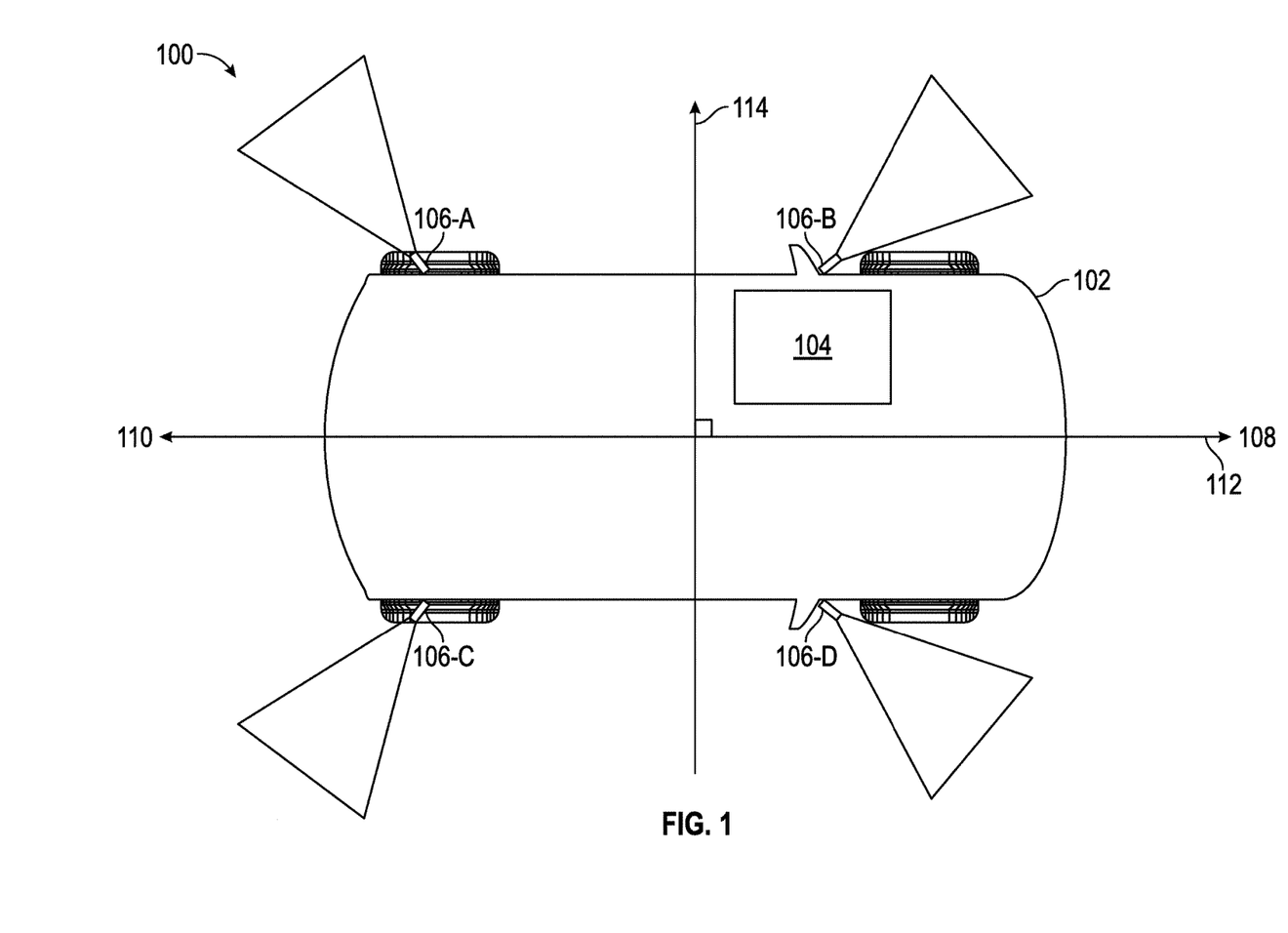
FIG. 1 is a diagram of a system for capturing images exterior to a motor vehicle, in accordance with the disclosed embodiments.

Turning now to the figures, FIG. 1 is a diagram of a system 100 for capturing images exterior to a motor vehicle 102, in accordance with the disclosed embodiments. The vehicle 102 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The vehicle 102 includes one or more cameras 106 positioned on the exterior of the vehicle 102. The one or more cameras 106 may be mounted on an exterior surface of the vehicle 102, built into the vehicle 102 and positioned to obtain an exterior view of the surroundings of the vehicle 102, or the like. The cameras 106 may be implemented using any suitable image capture device with the capability of being mounted to the exterior of a motor vehicle 102, including video cameras and/or still-frame cameras. Cameras 106 may be built-in to the system and/or provided by a vehicle manufacturer, an image masking system manufacturer, or the like.

The vehicle 102 further includes a reference point 104 (i.e., a reference location interior to the vehicle 102), from which an outside perspective (i.e., a view outside of the vehicle 102 from the inside of the vehicle 102) is obtained. Although the reference point 104 may be associated with any desired location of the vehicle 102, the reference point 104 is generally associated with the driver seat position of the vehicle 102. Images are captured from the perspective of the reference point 104, images are analyzed and calculations are performed using data relative to a reference point 104, and images are presented to an occupant or operator of the vehicle 102 in the position of the reference point 104.

The vehicle 102 is configured to travel in a forward travel direction 108 or a reverse travel direction 110. When the vehicle 102 is traveling in a forward travel direction 108, cameras 106-B, 106-D capture images outside of the vehicle 102. In this scenario, cameras 106-B, 106-D acquire images in the forward travel direction 108 which are less than 90 degrees from axis 114 (x-axis illustrating the forward travel direction 108 and the reverse travel direction 110). When traveling in a reverse travel direction 110, cameras 106-A, 106-C acquire images in the reverse travel direction 110 which are less than 90 degrees from axis 114. Cameras 106 may be configured to capture images in any direction and/or location except at the 90 degree location, which is axis 116 (y-axis at a right angle to axis 114). In certain embodiments, the cameras 106 are user-configurable, and may be activated and/or positioned as needed. In other embodiments, the cameras 106 are positioned to provide a particular view, such as a view normally obscured to the operator of the vehicle 102 (e.g., "blind-spots"). In this case, the cameras 106 may be pre-positioned and/or permanently positioned to provide blind-spot viewing capabilities.

Figure 2:
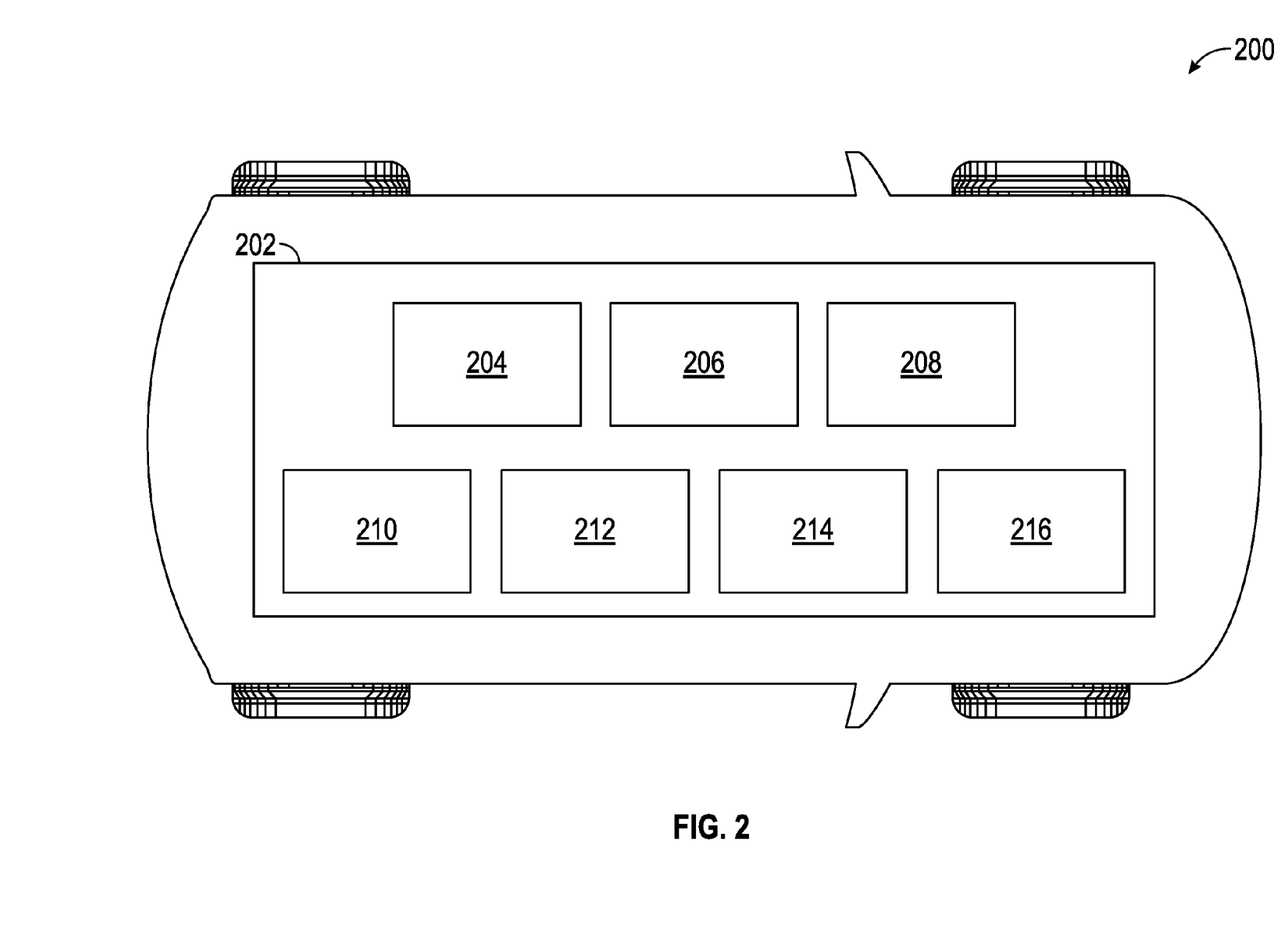
FIG. 2 is a functional block diagram of an image masking system, in accordance with the disclosed embodiments.

FIG. 2 is a functional block diagram of an image masking system 202 of a vehicle 200, in accordance with the disclosed embodiments. The image masking system 202 generally includes, without limitation: at least one processor 204, system memory 206, a user interface 208, a camera module 210, an image data analysis module 212, an image editing module 214, and a presentation module 216. These elements and features of image masking system 202 may be operatively associated with one another, coupled to one another, or otherwise configured to cooperate with one another as needed to support the desired functionality—in particular, eliminating objects of a certain distance from images projected on the interior of the vehicle 200, as described herein. For ease of illustration and clarity, the various physical, electrical, and logical couplings and interconnections for these elements and features are not depicted in FIG. 2. Moreover, it should be appreciated that embodiments of the image masking system 202 will include other elements, modules, and features that cooperate to support the desired functionality. For simplicity, FIG. 2 only depicts certain elements that relate to the image masking techniques described in more detail below.

The at least one processor 204 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 204 may be realized as one or more microprocessors, controllers, microcontrollers, or state machines. Moreover, the at least one processor 204 may be implemented as a combination of computing devices, e.g., a combination of digital signal processors and microprocessors, a plurality of microprocessors, one or more microprocessors in conjunction with a digital signal processor core, or any other such configuration.

The system memory 206 may be realized using any number of devices, components, or modules, as appropriate to the embodiment. In practice, the system memory 206 could be realized as RAM memory, flash memory, EPROM memory, EEPROM memory, registers, a hard disk, a removable disk, or any other form of storage medium known in the art. In certain embodiments, the system memory 206 includes a hard disk, which may also be used to support functions of the at least one processor 204. The system memory 206 can be coupled to the at least one processor 204 such that the at least one processor 204 can read information from, and write information to, the system memory 206. In the alternative, the system memory 206 may be integral to the at least one processor 204. As an example, the at least one processor 204 and the system memory 206 may reside in a suitably designed application-specific integrated circuit (ASIC).

The user interface 208 may include or cooperate with various features to allow a user to interact with the image masking system 202. Accordingly, the user interface 208 may include various human-to-machine interfaces, e.g., a keypad, keys, a keyboard, buttons, switches, knobs, a touch-pad, a joystick, a pointing device, a virtual writing tablet, a touch screen, a microphone, or any device, component, or function that enables the user to select options, input information, or otherwise control the operation of the image masking system 202. For example, the user interface 208 could be manipulated by an operator to select an image capture software application, and configure operational parameters for a plurality of onboard cameras via the image capture software application.

The camera module 210 includes one or more image capture devices in communication with various elements of the image masking system 202. Generally, the cameras are implemented using any image capture device appropriate for acquiring a "continuous image" (e.g., a video feed or plurality of still-frame images) of the surroundings of the vehicle 200 from a position outside of the vehicle 200 (e.g., an exterior surface of the vehicle 200), as described above with regard to FIG. 1. The positioning of the cameras of the camera module 210 may be determined by user preference and/or manufacturer "default" positioning, and each camera may be positioned to capture images anywhere less than 90 degrees from a forward and/or reverse traveling direction of the vehicle 200. Any number of cameras may be part of the image masking system 202, and typical embodiments include cameras strategically located in order to capture images in a vehicle's "blind spots" (e.g., areas that are obstructed from a driver's view). Here, the exemplary embodiment described 90 degrees as an example, and other embodiments may use cameras with a more or less angular field of view.

The camera module 210 is configured to capture a plurality of images outside a motor vehicle 200 while the motor vehicle is in motion. Each camera associated with the camera module 210 may have the ability to capture video images and/or still frames. Once images are obtained by a camera, the images may be stored (in system memory 206), analyzed (by the image data analysis module 212), edited (by the image editing module 214), and displayed and/or streamed for projection (by the presentation module 216).

The image data analysis module 212 configured to evaluate one or more images captured by the camera module 210, to identify objects in each evaluated image, and to determine whether the object is in the foreground or the background of the image. "Foreground objects" are located within a predetermined radius from a reference point in the motor vehicle 200, while "background objects" include any object outside of this radius. The predetermined radius scales with vehicle speed. For example, a predetermined radius may expand from 3 meters to 10 meters, as the vehicle speed increases. In certain embodiments, a user can manually adjust the predetermined radius value, in order to increase or decrease the value, to bring the radius nearer to, or further away from, the vehicle. When an object is determined to be in the foreground of the image, the image data analysis module 212 takes no further action. However, when an object is determined to be in the background of an image, the image data analysis module 212 provides this information to the image editing module 214 for further use.

The image editing module 214 communicates with the image data analysis module 212 to receive data designating objects located in the background of analyzed images (i.e., "background objects"). The image editing module 214 is further configured to "mask" these background objects to eliminate them from an output, edited version of the image. Masking involves providing information for small portions of an analyzed image, pixel by pixel, in either black (i.e., no light emitted/transmitted) for opaque displays (e.g., LCD, OLED), or transparent for transparent displays (e.g., TOLED). The edited image includes "foreground objects" only; in other words, objects that are in close proximity to the motor vehicle 200 and, therefore, are potential obstacles to movement of the motor vehicle 200. The image editing module performs the elimination of background objects from the edited image to minimize distractions to a driver of a moving motor vehicle 200. The edited version of the image is suitable for output and presentation in the interior of the motor vehicle 200.

Figure 3:
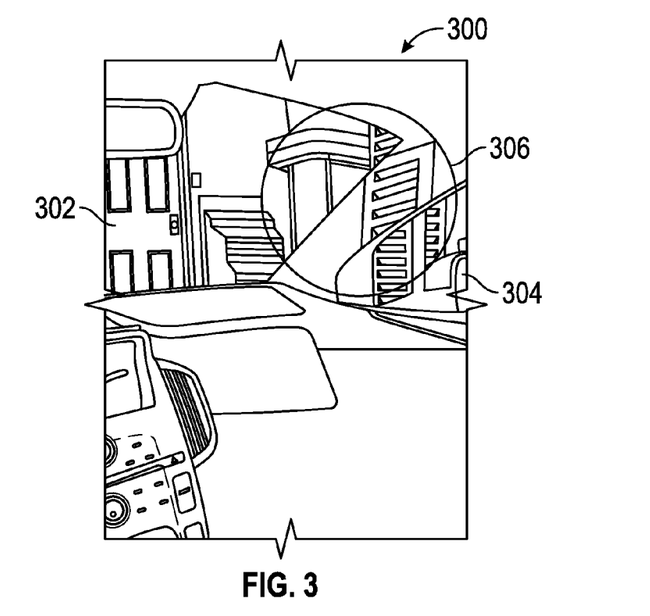
FIG. 3 is a diagram of an interior of a motor vehicle, in accordance with an embodiment.

The presentation module 216 is configured to receive and display output images edited by the image editing module 214. When a user elects to display images from the presentation module 216, in certain embodiments, the images may be displayed on an in-vehicle console display, such as a user interface 208, an "infotainment" system, and/or any type of vehicle console display. In other embodiments, however, the images may be displayed as a projection on an interior surface of the motor vehicle 200, such as a pillar, a dashboard, an interior surface of a door, or the like. In this way, the presentation module 216 is configured to "fill in" one or more gaps in a panoramic view from the perspective of the driver position of the motor vehicle 200. This panoramic view includes the view out of the windshield and/or other windows of the motor vehicle 200, which may be obstructed by interior parts of the motor vehicle 200 (e.g., pillar, dashboard, door, etc.). In certain embodiments, the presentation module 216 is configured to obtain an image which includes the obstructed features, and to display this image in the area of the obstruction. For example, FIG. 3 depicts the interior of a motor vehicle 300 (see reference 200 of FIG. 2), which includes an outside view from the windshield 302 and the car door window 304. As shown, the outside view is partially blocked by the A-pillar 306. However, FIG. 3 also illustrates that an image of the obstructed features is projected on the A-pillar 306, to complete the view or, in other words, to "fill in" the gap introduced by the A-pillar 306. The result is that the A-pillar 306 no longer obstructs the outside view, rendering the outside view from the motor vehicle 300 visible in its entirety, in this particular embodiment.

Returning to FIG. 2, via the presentation module 216, a user may elect to view one or more images that have been captured and edited. A user may also view an edited video feed that has been captured and edited. The presentation module 216 is configured to present edited images from one or more of the cameras associated with the camera module 210, and images from more than one camera may be presented at different locations in the interior of the vehicle 200 at the same time.

In practice, the camera module 210, the image data analysis module 212, the image editing module 214, and/or the presentation module 216 may be implemented with (or cooperate with) the at least one processor 204 to perform at least some of the functions and operations described in more detail herein. In this regard, the camera module 210, the image data analysis module 212, the image editing module 214, and/or the presentation module 216 may be realized as suitably written processing logic, application program code, or the like.

Figure 4:
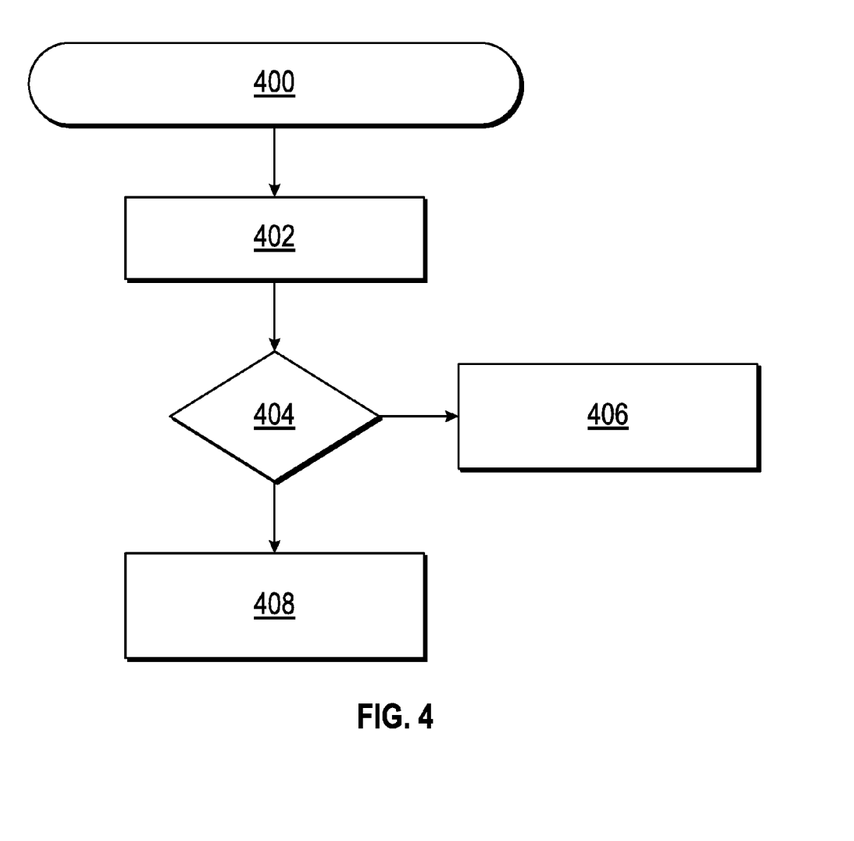
FIG. 4 is a flow chart that illustrates an embodiment of a process for processing a plurality of images associated with a moving motor vehicle.

FIG. 4 is a flow chart that illustrates an embodiment of a process 400 for processing a plurality of images associated with a moving motor vehicle. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system.

It should be appreciated that process 400 may include any number of additional or alternative tasks; the tasks shown in FIG. 4 need not be performed in the illustrated order; and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

For ease of description and clarity, it is assumed that the process 400 begins by identifying an object in the plurality of images (step 402). The plurality of images associated with a moving motor vehicle includes a group of pictures or a video feed from the perspective of an "outside view" from the inside of the vehicle. The plurality of images is generally collected via image capture device (e.g., a still-frame and/or video camera) on the outside of the vehicle, and the images are obtained while the vehicle is in motion. An object may be any identifiable feature depicted in an image, and an image may include any number of objects. In certain embodiments, the process 400 evaluates color values for each pixel, and similar colors associated with pixels in close proximity to one another are identified as an object, while dissimilar colors associated with pixels in close proximity to one another are identified as a border of an object.

After identifying an object in the plurality of images (step 402), the process 400 determines whether the object is located in the background of the plurality of images (step 404). One particular methodology for performing step 404 is described below with reference to FIG. 6 and the process 600. Each image may include objects in the foreground or background of the image. Foreground objects may be defined as objects that appear closer to the camera capturing the image, and are therefore closer to the vehicle. Due to the proximity of a foreground object to the vehicle, it is of particular interest to a driver of the vehicle during movement and maneuvering of the vehicle. Background objects appear, in the captured images, to be further away from the camera capturing the image. Background objects are thus further away from the vehicle itself, and are of a decreased level of interest because they are not a factor in the decision-making of the driver while maneuvering the vehicle. In addition, background objects appear blurry in an image taken outside of a moving vehicle, and present a distraction to a driver viewing a display of the image.

Figure 5:
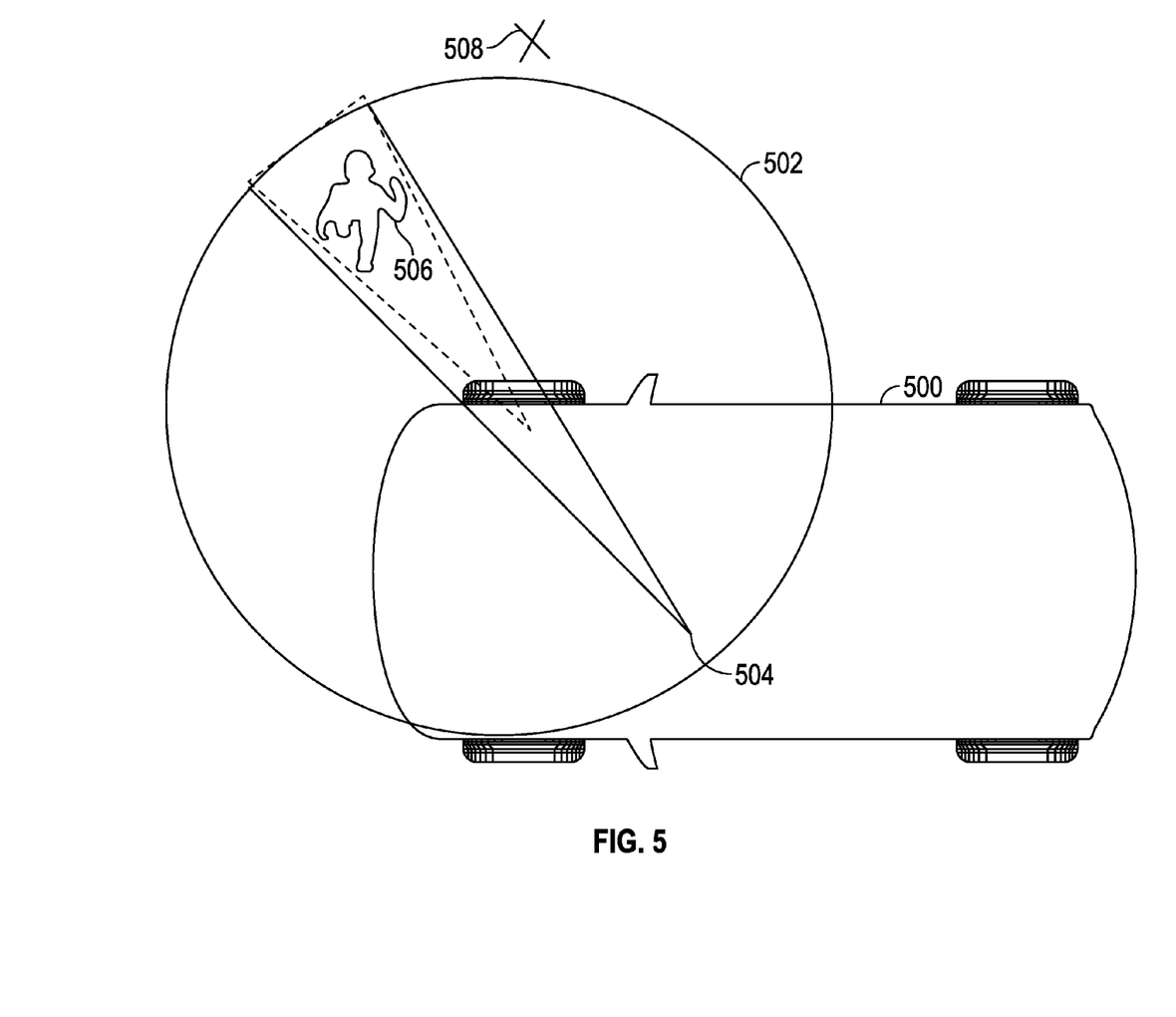
FIG. 5 is a diagram of a motor vehicle and a predetermined radius, in accordance with an embodiment.

Generally, distinguishing foreground objects from background objects includes identifying whether an object is located inside or outside of a predetermined radius, relative to a reference point, as depicted in FIG. 5. In the embodiment shown, a vehicle 500 has a reference point 504 located in the driver seat position of the vehicle 500. In other embodiments, the reference point 504 may be located in another interior position of the vehicle 500. A reference point 504 generally includes any point in the vehicle from which an occupant may observe an outside view, through the windshield and other windows of the vehicle.

As shown, the person 506 is located within a predetermined radius 502 of the reference point 504, rendering the person 506 as a "foreground" object in an image presented to an occupant of the vehicle 500, when the occupant of the vehicle 500 is located in the reference point 504 location. Similarly, object 508 is located outside of the predetermined radius 502 of the reference point 504, and therefore the object 508 appears to an occupant of the vehicle 500 as a "background" object in an image. Images captured outside the vehicle 500, for purposes of presentation to an operator of the vehicle, are presented from the perspective of the chosen reference point 504. Thus, objects appearing as foreground objects to an occupant of the vehicle 500 located at the reference point 504 will also appear as foreground objects in images captured outside the vehicle 500, and objects appearing as background objects to the same occupant at the reference point 504 appear as background objects in images captured outside the vehicle 500.

Returning to FIG. 4, when the process 400 determines that the object is located in the background of the plurality of images (the "Yes" branch of 404), then the process 400 filters the object from a presentation of the plurality of images (step 408). Here, the process 400 removes, or "masks", the background object from a presentation of the plurality of images. Removal of the background object eliminates an unnecessary distraction from a presentation of the plurality of images, in the form of a blurry background area where the object is located.

However, when the object is not located in the background of the plurality of images (the "Yes" branch of 404), the process 400 does not filter the object from a presentation of the plurality of images (step 406), allowing the object to remain visible in the presentation for the driver of the vehicle. Here, foreground objects (e.g., objects located within a predetermined radius of the reference point of the vehicle) are permitted to remain visible in the presentation. The result is a presentation including foreground objects only, due to the elimination of background images through by the process 400.

Figure 6:
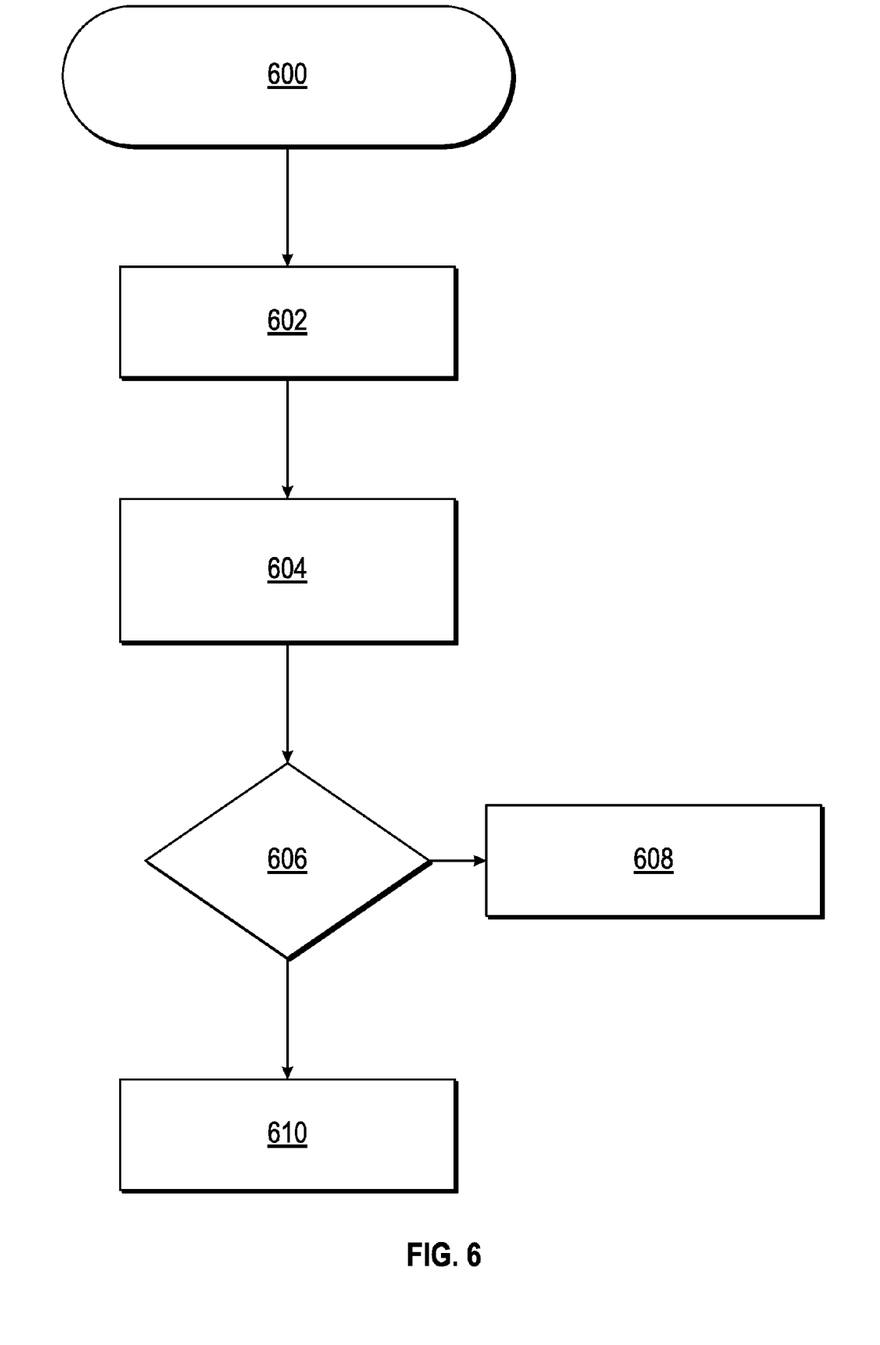
FIG. 6 is a flow chart that illustrates an embodiment of a process for determining whether an object is located within a predetermined radius of a driver position of a moving motor vehicle.

FIG. 6 is a flow chart that illustrates an embodiment of a process 600 for determining whether an object is located within a predetermined radius of a driver position of a moving motor vehicle. First, the process 600 identifies a shape of an object in a plurality of captured images (step 602). Here, the process 600 evaluates color values, pixel by pixel, and like colors are identified as an object, dissimilar colors are identified as a border of an object.

Figure 7:
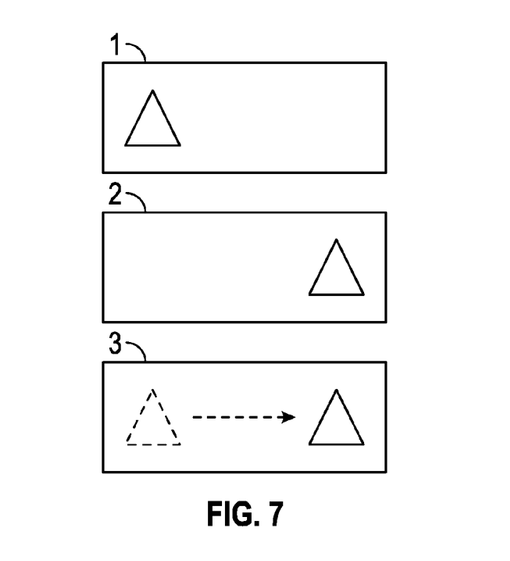
FIG. 7 is a diagram of an the translation of an object across a plurality of images, in accordance with an embodiment.

After identifying the shape of the object (step 602), the process 600 determines a rate of translation of the shape across the plurality of captured images (step 604). One suitable methodology for determining a rate of translation is described below with reference to the flowchart of FIG. 8. Translation of an object includes movement of the object from a first position in a first image to a second position in a second image, wherein first and second images are captured from the same position and perspective. For example, as shown in FIG. 7, image (1) depicts a shape in a left-side position; image (2) depicts the same shape in a right-side position; and image (3) depicts the relationship between the two positions of the shape, before and after movement of the shape. Here, the shape has been "translated" from the first position (shown in image (1)) to the second position (shown in image (2)).

The rate of translation for a shape across a plurality of images may be defined as a change in the position of the object, in the images, as the change relates to time. For example, an object may move a certain number of pixels per second, millisecond, etc. In certain embodiments, the rate of translation is the speed of the movement of an object across a video feed, which indicates whether the object is in the background or the foreground of the video feed, from a perspective of a reference point in the vehicle. Here, the process 600 identifies the change in position of the object and its relationship to the amount of time that has passed during the position change.

Next, the process 600 determines whether the determined rate of translation is less than a threshold rate of translation (step 606). The threshold rate of translation indicates the minimum speed at which an object in a captured image must be translated in order to be identified as a "foreground" object. Foreground objects, which are closer to the vehicle, move across an image at a faster speed than background objects. An object translated at a rate less than the threshold rate is in the background of a captured image, and these background objects may appear distorted or blurred.

The threshold rate of translation is a predefined value that changes with changes in the velocity of the vehicle. More specifically, the threshold rate of translation is directly proportional to the velocity of the vehicle, or in other words, the faster the vehicle is moving, the faster the threshold rate of translation must be. In certain embodiments, the process 600 obtains a current velocity of the vehicle, and performs a lookup to determine the threshold rate, based on the current velocity.

If the rate of translation is less than the threshold rate (the "Yes" branch of 606), the process 600 determines that the object is not located within the predetermined radius (step 608), and therefore, the object is a background object in any captured image at the vehicle. Here, the translation rate is "slow" (i.e., slower than the threshold rate), and the object is not moving quickly enough to appear with clarity in the captured images. However, if the rate of translation is not less than the threshold rate (the "No" branch of 606), the process 600 determines that the object is located within the predetermined radius (step 610), and therefore, the object is a foreground object in any captured image at the vehicle. In this circumstance, the translation rate is "fast" (i.e., as fast as or faster than the threshold rate), and the object is moving at a rate that renders it clearly visible in the captured images.

Figure 8:
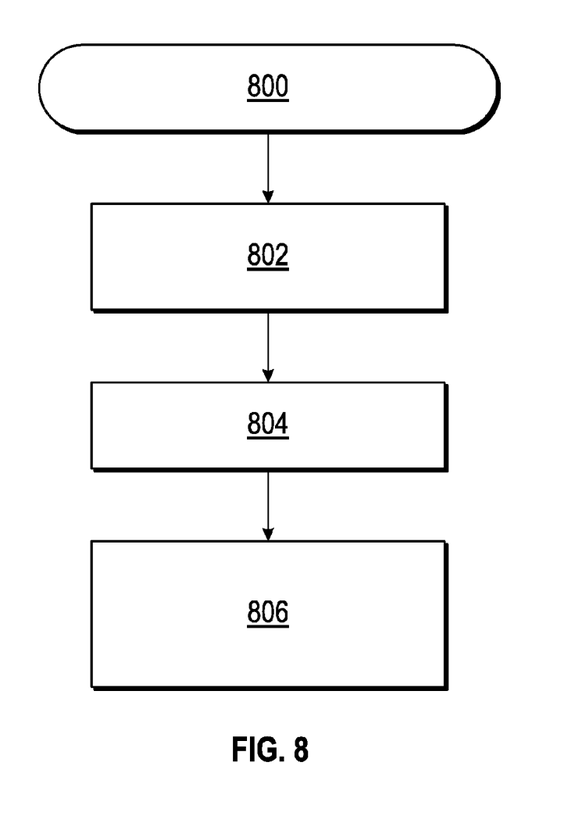
FIG. 8 is a flow chart that illustrates an embodiment of a process 800 for determining a rate of translation of a shape across a plurality of images.

FIG. 8 is a flow chart that illustrates an embodiment of a process 800 for determining a rate of translation of a shape across a plurality of images. It should be appreciated that the process 800 described in FIG. 8 represents one embodiment of step 604 described above in the discussion of FIG. 6, including additional detail. First, the process 800 samples the plurality of images at a predefined rate (step 802). Here, the process 800 views the object in question, at a particular time, and identifies the position (i.e., location) of the object in the image at that time. The process 800 then repeats the procedure after a defined period of time, identifying a second location of the object in the image. The process 800 may determine image locations for the object any number of times, using the defined period of time as the rate for sampling the image.

Next, the process 800 identifies a rate of image capture (step 804) for the plurality of images. This is generally the shutter speed of the camera being used, such as 60 frames per second, etc. The rate of image capture may be stored in any form of system memory or at one or more of the cameras, and may be retrieved by the process 800 to perform calculations.

The process 800 then calculates the rate of translation based on the rate of image capture and the predefined sampling rate (step 806). The rate of translation indicates a movement in the number of pixels per predefined period of time (pixels per second, per millisecond, etc.).

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium", "computer-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing a plurality of images associated with a motor vehicle, the method comprising:
   capturing the plurality of images via image capture device located on an exterior surface of the motor vehicle;
   identifying an object in the plurality of images;
   determining whether the object is located in the background of the plurality of images, by:
   identifying whether the object is located within a predetermined radius of a driver position of the motor vehicle; and
      when the object is not located within a predetermined radius of the driver position, determining that the object is located in the background of the plurality of images;
   presenting the plurality of images on an interior display of the motor vehicle, to generate a presentation of the plurality of images; and
   when the object is located in the background of the plurality of images, filtering the object from the presentation of the plurality of images.

2. The method of claim 1, further comprising:
   when the object is located within a predetermined radius of the driver position, including the object in the presentation of the plurality of images.

3. The method of claim 1, wherein the determining step further comprises:
   identifying a shape of the object in the plurality of images;
   determining a rate of translation of the shape across the plurality of images; and
   when the rate of translation is less than a threshold rate, determining that the object is not located within the predetermined radius of the driver position.

4. The method of claim 3, further comprising sampling the plurality of images at a predefined rate, to identify the object;
   wherein the determining step further comprises:
      identifying a rate of image capture; and
      calculating the rate of translation based on the rate of image capture and the predefined rate.

5. The method of claim 3, wherein determining the rate of translation further comprises:
   identifying a first image location for the shape;
   after a defined period of time, identifying a second image location for the shape; and
   determining the rate of translation, based on the first image location, the second image location, and the defined period of time.

6. The method of claim 1, wherein the filtering step further comprises:
   identifying a threshold rate of translation;
   comparing the rate of translation of the object to the threshold rate of translation; and
   when the rate of translation is less than the threshold rate, masking the object from the presentation of the plurality of images.

7. The method of claim 6, further comprising:
   obtaining a current velocity of the motor vehicle; and
   using a look-up table to determine the threshold rate, based on the current velocity.

8. The method of claim 1, wherein the threshold rate comprises a value directly proportional to a velocity of the motor vehicle.

9. A system for presenting a captured image associated with a motor vehicle, the system comprising:
   a camera module, configured to capture a plurality of images outside a motor vehicle;
   an image data analysis module, configured to identify an object in the plurality of images, and to determine whether the object is located within a radius of a reference point of the motor vehicle;
   an image editing module, configured to create an output image by masking the object from the plurality of images when the object is not located within the radius of the reference point; and
   a presentation module, configured to display the output image created by the image editing module.

10. The system of claim 9, wherein the reference point of the motor vehicle comprises a driver seat position of the interior of the motor vehicle.

11. The system of claim 9, wherein the image data analysis module is further configured to:
   identify a shape of the object;
   calculate a rate of translation of the shape across the plurality of images; and
   when the rate of translation is less than a threshold rate, determine that the object is not located within the radius of a reference point of the motor vehicle.

12. The system of claim 11, wherein the image data analysis module is further configured to:
   identify a rate of image capture associated with the camera module;
   sample the plurality of images at a predefined rate to identify the object; and
   calculate the rate of translation based on the rate of image capture and the predefined rate.

13. The system of claim 11, wherein the image data analysis module is further configured to:
   identify a first image location for the shape;
   after a defined period of time, identify a second image location for the shape; and
   determine the rate of translation based on the first image location, the second image location, and the defined period of time.

14. A non-transitory, computer-readable medium containing instructions thereon, which, when executed by a processor, perform a method comprising:

identifying a plurality of objects depicted in a sequence of images captured outside of a motor vehicle, each of the plurality of objects being located outside of the motor vehicle;

calculating a translation rate for each of the plurality of objects, based on an analysis of the captured sequence of images;

masking a subset of the plurality of objects from the sequence of images, based on the calculated translation rate for each of the plurality of objects, to create an output image; and presenting the output image.

15. The non-transitory, computer-readable medium of claim 14, wherein the method further comprises sampling the continuous image using a predefined sampling rate; and wherein the calculating step further comprises:
identifying a rate of image capture; and
calculating the translation rate based on the rate of image capture and the predefined sampling rate.

16. The non-transitory, computer-readable medium of claim 14, wherein the masking step further comprises eliminating the subset of the plurality of objects from the sequence of images, and wherein the created output image comprises the sequence of images after eliminating the subset.

17. The non-transitory, computer-readable medium of claim 14, wherein the method further comprises obtaining the sequence of images via image capture device positioned on an exterior surface of the motor vehicle; and wherein the presenting step further comprises projecting the output image on an interior surface of the motor vehicle.

18. The non-transitory, computer-readable medium of claim 14, wherein the method further comprises obtaining the sequence of images via image capture device positioned on an exterior surface of the motor vehicle; and wherein the presenting step further comprises displaying the output image via user interface of the motor vehicle.

\* \* \* \* \*